UNITED STATES PATENT OFFICE.

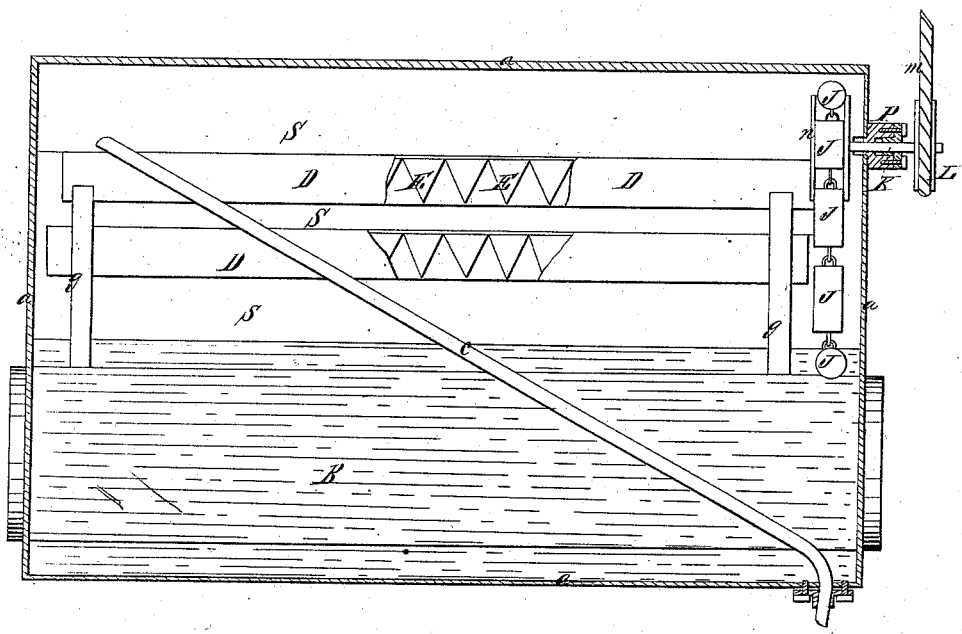

JOHN McMURTRY, OF LEXINGTON, KENTUCKY.

IMPROVEMENT IN STEAM-GENERATORS.

Specification forming part of Letters Patent No. 58,275, dated September 25, 1866.

*To all whom it may concern:*

Be it known that I, JOHN MCMURTRY, of Lexington, in the county of Fayette and State of Kentucky, have invented a new and Improved Mode of Generating Steam and Evaporating Liquids, Water, &c.; and I do hereby declare that the following is a full and exact description thereof, reference being had to the accompanying drawing, and to the letters of reference marked thereon.

The nature of my invention consists in the combination of certain mechanical devices for generating steam.

To enable others skilled in the art to make and use my invention, I will proceed to describe the mode of making said heat available for the purposes above named and its operation.

Take any of the common steam-boilers for generating steam, with their accustomed appendages—for example, as shown in the annexed drawing—and place one or more shallow pans in that portion of the boiler called the "steam-room," one above the other, and kept in position by means of the legs of the lower pan resting on the flues of the boiler, and make the upper pans successively smaller than the lower ones, so that the legs of each pan will rest in the one below it, thus enabling the lower pan to receive the overflow from the pan above it, as shown in annexed drawing, to which reference is made as forming a part of this specification.

Figure 1 represents a sectional view of a boiler, of the ordinary form, for generating steam, with my improvement attached.

A A represent the exterior of the boiler. B represents the flue in the boiler.

C represents the ordinary supply-pipe, which, in the absence of other means, may be lengthened, as shown, for the purpose of filling the evaporating-pans D D.

D D represent shallow evaporating-pans, with corrugated bottoms, as shown at E E, being elevated into and held in steam-space S S, and kept filled with whatever it is desired to have evaporated by means of what is termed the "latent heat" (or extra heat) in the steam; $g\ g$, legs of the evaporating-pans D D.

J J represent cups hinged together, forming an endless chain of cups, operated by the carrying-arms $n$ and worked by the axle K, passing through the stuffing-box P, which is operated by the band $m$ on the pulley L, for the purpose of elevating the water, &c., into the pans D D.

The bluish-green color in Fig. 1 represents the water, &c., in boiler and pans D D.

Letters refer to like parts of drawing.

Fig. 1 represents a sectional view of my evaporating-pan D D in position, showing in part their bottoms, which I make corrugated, for the purpose of obtaining increased surface for the steam to act on.

In Fig. 1 I show the supply-pipe lengthened, so that the common feed-water, &c., from the injector may pass a sufficient distance through the water and steam in the boiler, so as to heat the same to the proper temperature and empty the same into the topmost pan, from whence the surplus overflows to the several pans successively.

In the case of generating steam only, I prefer to fill the said pans D D from the water in the boiler, and to be independent of the feed-water, as cases might arise where the water would get too low in the boiler, and it might be desirable to raise the water in the b without creating additional steam. In such an event I prefer, as remarked, to fill the evorating-pans D D independently of the supply-pipe of the boiler, somewhat as shown in the annexed drawing—viz., by means of the common elevators J J, operated by the arms $n$ on the axle K, passing through the stuffing-box P, and operated by the band $m$ on the pulley.

I do not confine myself to this mode of elevating the water, &c., to the upper pan; but the same may be done by the axle K being made to operate a pump, or any other known means of operating to elevate water, liquids, &c.

My improvement, as above remarked, can be made available not only for the purpose of generating steam with safety and economy, but also with equal advantage for the evaporation of liquids, &c., causing them to part with their water into steam and leave their deposits in the pans D D, which may be extracted by pipes in connection with the pans by means of the pressure of the steam acting on their surface, or by other known means of extraction.

I do not claim the discovery of the extra heat in steam, as above explained, for said fact has long been known; but

What I claim as my invention, and desire to secure by Letters Patent, is—

1. The combination of the supply-pipe C and the evaporating-pans D D and E E, the latter having corrugated bottoms, the whole constructed and operating as herein set forth.

2. The combination of the hinged cups J J, the arms $n$, the axle K, the stuffing-box P, and the pulley L, the whole constructed and operating substantially as herein specified.

JOHN McMURTRY.

Witnesses:
   Z. GIBBONS,
   T. STAHEL.